(12) United States Patent
Mei et al.

(10) Patent No.: US 11,023,530 B2
(45) Date of Patent: Jun. 1, 2021

(54) PREDICTING USER PREFERENCES AND REQUIREMENTS FOR CLOUD MIGRATION

(71) Applicant: INTERNATIONAL BUSINESS MACHINES CORPORATION, Armonk, NY (US)

(72) Inventors: Li Jun Mei, Beijing (CN); Jie Ma, Nanjing (CN); Ya Bin Dang, Beijing (CN); Jinho Hwang, Ossining, NY (US); Chen Lin, Elmsford, NY (US); John Rofrano, Mahopac, NY (US); Anup Kalia, Elmsford, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 16/274,867

(22) Filed: Feb. 13, 2019

(65) Prior Publication Data

US 2020/0257733 A1    Aug. 13, 2020

(51) Int. Cl.
| | |
|---|---|
| *G06F 16/9032* | (2019.01) |
| *G10L 15/22* | (2006.01) |
| *G06F 16/9035* | (2019.01) |
| *G10L 25/30* | (2013.01) |
| *G10L 25/54* | (2013.01) |
| *G06F 16/9038* | (2019.01) |

(52) U.S. Cl.
CPC .... *G06F 16/90332* (2019.01); *G06F 16/9035* (2019.01); *G06F 16/9038* (2019.01); *G10L 15/22* (2013.01); *G10L 25/30* (2013.01); *G10L 25/54* (2013.01); *G10L 2015/225* (2013.01)

(58) Field of Classification Search
USPC .......................................................... 704/200
See application file for complete search history.

(56) References Cited

U.S. PATENT DOCUMENTS 8,046,251 B2 * 10/2011 Scarborough ........ G06Q 10/063
                                                    705/7.17
9,330,084 B1    5/2016 Kadambi et al.
(Continued)

FOREIGN PATENT DOCUMENTS

WO    WO2007011655    1/2007

OTHER PUBLICATIONS

Guha et al., "Approximate XML Joins", ACM SIGMOD '2002, Jun. 2002, 12 pages.
(Continued)

*Primary Examiner* — Marcus T Riley
(74) *Attorney, Agent, or Firm* — Tutunjian & Bitetto, P.C.; Joseph Petrokaitis

(57) ABSTRACT

Systems and methods for prioritizing interview questions, including predicting answers to questions in a candidate question set using a neural network model, and generating a ranking for each of the questions in the candidate question set by determining answer confidence, completeness, and ambiguity for each of the answers, and incorporating user preferences using a personalized preference matrix. A top ranked question is automatically selected and presented to the user, and the personalized preference matrix is iteratively adjusted for subsequent ranking of questions based on an answer to the top ranked question by the user to reduce computational resources expended.

20 Claims, 10 Drawing Sheets

(56) References Cited

U.S. PATENT DOCUMENTS

| | | | |
|---|---|---|---|
| 9,378,486 B2 | 6/2016 | Taylor et al. | |
| 9,722,858 B2 | 8/2017 | Markley et al. | |
| 2002/0055866 A1* | 5/2002 | Dewar | G06Q 10/0639 705/7.38 |
| 2003/0191680 A1* | 10/2003 | Dewar | G06Q 10/1053 706/45 |
| 2004/0093263 A1 | 5/2004 | Doraisamy et al. | |
| 2005/0246299 A1* | 11/2005 | Scarborough | G06Q 10/10 706/21 |
| 2007/0078668 A1* | 4/2007 | Pathria | G06F 21/31 726/7 |
| 2009/0187446 A1* | 7/2009 | Dewar | G06Q 10/0639 706/45 |
| 2015/0324182 A1* | 11/2015 | Barros | G06F 9/44505 717/174 |
| 2017/0316775 A1* | 11/2017 | Le | G10L 15/16 |
| 2018/0114108 A1 | 4/2018 | Lao et al. | |
| 2018/0357221 A1* | 12/2018 | Galitsky | G06F 40/205 |
| 2020/0257733 A1* | 8/2020 | Mei | G06F 16/9035 |
| 2020/0395008 A1* | 12/2020 | Cohen | G06F 40/284 |

OTHER PUBLICATIONS

Pahl et al., "A Comparison of On-premise to Cloud Migration Approaches", Lecture Notes in Computer Science, Sep. 2013, pp. 1-15.

Surya et al., "Automatic Question and Answer Pair Generation", Special Issue Published in International Journal of Trend in Research and Development (IJTRD), National Conference on Social, Mobile, Analytics and Cloud Services (NCSMAC-2016), Sep. 2016, pp. 86-87.

Tawfique et al., "Decision to migrate to the Cloud", A focus on security from the consumer perspective, Linnaeus University, Feb. 2018, 55 pages.

\* cited by examiner

PREDICTING USER PREFERENCES AND REQUIREMENTS FOR CLOUD MIGRATION

BACKGROUND

The present invention generally relates to cloud migration, and more particularly to managing cloud migration based on generated prioritized interview questions and predicted user preferences.

Cloud migration can include highly dynamic requirement changes based on the source and target environments, and existing applications/services being migrated to newer environments are often desired to be adjusted based on user preferences. To understand the client preferences, Subject Matter Experts (SMEs) generally must interview each individual client and ask many different questions to determine the preferences of a particular user, and the SMEs can then analyze the results for each user to formulate a cloud migration plan to recommend to the particular user. However, asking many questions (e.g., one by one) to each end user is very time consuming for both the SMEs and the users, which can lead to increased costs and delays for cloud migration, in particular during cloud migration of a large amount of users (e.g., enterprise-level, regional-level, workgroup-level, etc.).

SUMMARY

In accordance with an embodiment of the present invention, a method is provided for prioritizing interview questions. Answers to questions in a candidate question set are predicted using a neural network model, and a ranking for each of the questions in the candidate question set is generated by determining answer confidence, completeness, and ambiguity for each of the answers, and incorporating user preferences using a personalized preference matrix. A top ranked question is automatically selected and presented to the user, and the personalized preference matrix is iteratively adjusted for subsequent ranking of questions based on an answer to the top ranked question by the user.

In accordance with another embodiment of the present invention, a system is provided for prioritizing interview questions. A processor device operatively coupled to a memory is configured for predicting user answers for interview question/answer pairs. Answers to questions in a candidate question set are predicted using a neural network model, and a ranking for each of the questions in the candidate question set is generated by determining answer confidence, completeness, and ambiguity for each of the answers, and incorporating user preferences using a personalized preference matrix. A top ranked question is automatically selected and presented to the user, and the personalized preference matrix is iteratively adjusted for subsequent ranking of questions based on an answer to the top ranked question by the user.

In accordance with another embodiment of the present invention, a non-transitory computer-readable storage medium including a computer readable program is provided for prioritizing interview questions. Answers to questions in a candidate question set are predicted using a neural network model, and a ranking for each of the questions in the candidate question set is generated by determining answer confidence, completeness, and ambiguity for each of the answers, and incorporating user preferences using a personalized preference matrix. A top ranked question is automatically selected and presented to the user, and the personalized preference matrix is iteratively adjusted for subsequent ranking of questions based on an answer to the top ranked question by the user.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 2:
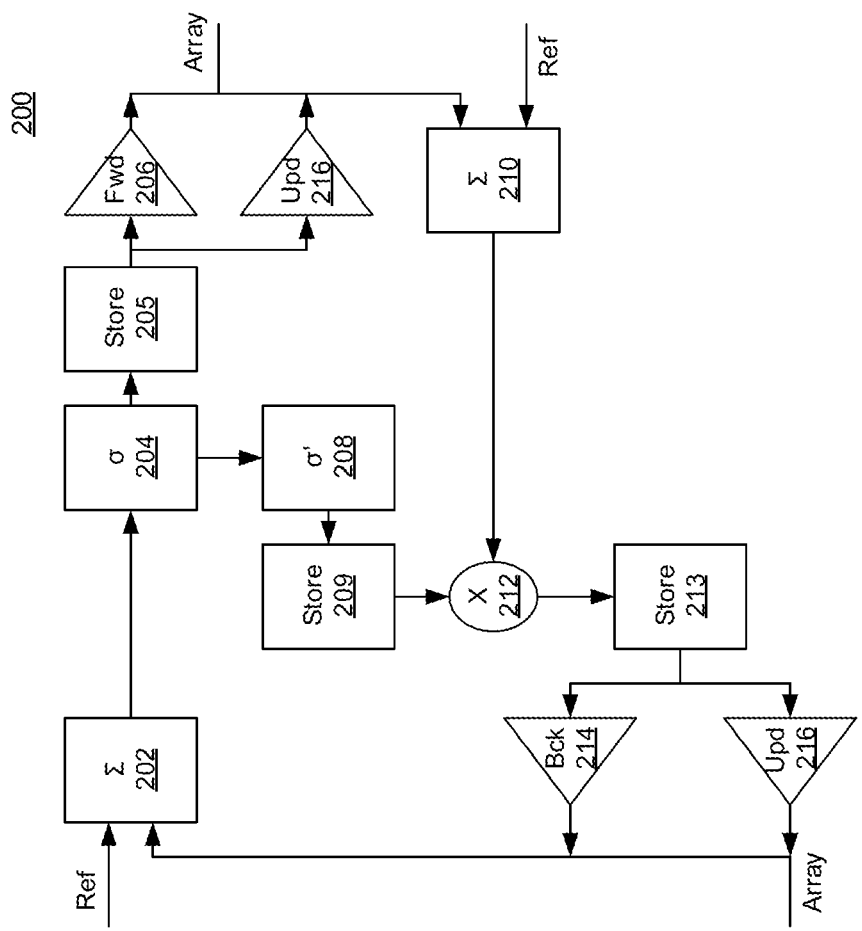
FIG. 2 is a block/flow diagram illustrating an exemplary neuron in a neural network, in accordance with an embodiment of the present invention.

According to an aspect of the present invention, a system and method is provided for managing cloud migration (e.g., applications, services, data, etc.) based on prioritized interview questions and predicted user preferences.

In some embodiments of the present invention, we use a method to train content generation model for predicting user feedback based on their latent knowledge. We abstract interview question and user feedback, prepare training data, and train Content Generation Model (e.g., Seq2Seq) in accordance with an aspect of the present invention. A method to measure user feedback during interview is provided, and we can measure Answer Confidence/Completeness/Ambiguity, and also use a Personalized Preference Matrix (PPM) to consider the features of individual clients and avoid the overfitting during neural model training in accordance with an aspect of the present invention.

In some embodiments of the present invention, prioritized and/or customized interview questions can be generated, and based on the answer prediction using Content Generation Model, generate ordered answer list for possible answers. Answer confidence/completeness/ambiguity can be measured for each answer, multiplied by the PPM, and then prioritized/ranked candidate questions can be generated and/or prioritized for user interviews based on such reference data in accordance with an aspect of the present invention. In various embodiments of the present invention, a top ranked question can be selected and presented to a user, user feedback can be received, and the PPM can be iteratively adjusted (e.g., until a threshold level is reached) to generate an optimal prioritized question list and/or predict user preferences to maximize efficiency and speed for cloud migration, in accordance with an aspect of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
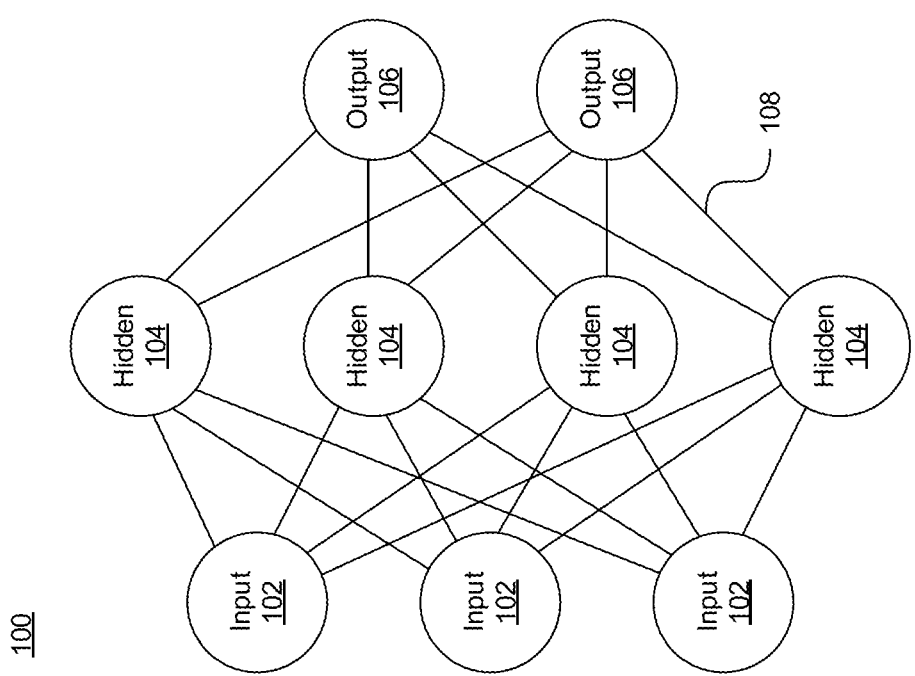
FIG. 1 is a high-level generalized diagram illustrating an exemplary neural network, in accordance with an embodiment of the present invention.

Referring now to the drawings in which like numerals represent the same or similar elements and initially to FIG. 1, a high-level generalized diagram showing an exemplary neural network 100 is illustratively depicted in accordance with one embodiment of the present invention. Neural networks demonstrate an ability to derive meaning from complicated or imprecise data and can be used to extract patterns and detect trends that are too complex to be detected by humans or other computer-based systems.

In one embodiment of the present invention, the structure of a neural network can include input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There may be any number of layers of hidden neurons 104, and as well as neurons that perform different functions. There exist different neural network structures as well, such as convolutional neural network, maxout network, artificial neural network, etc. A set of output neurons 106 accepts and processes weighted input from the last set of hidden neurons 104.

In one embodiment of the present invention, this represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of neural network, and it is to be appreciated that any type of neural network can be utilized in accordance with various embodiments of the present invention.

Figure 3:
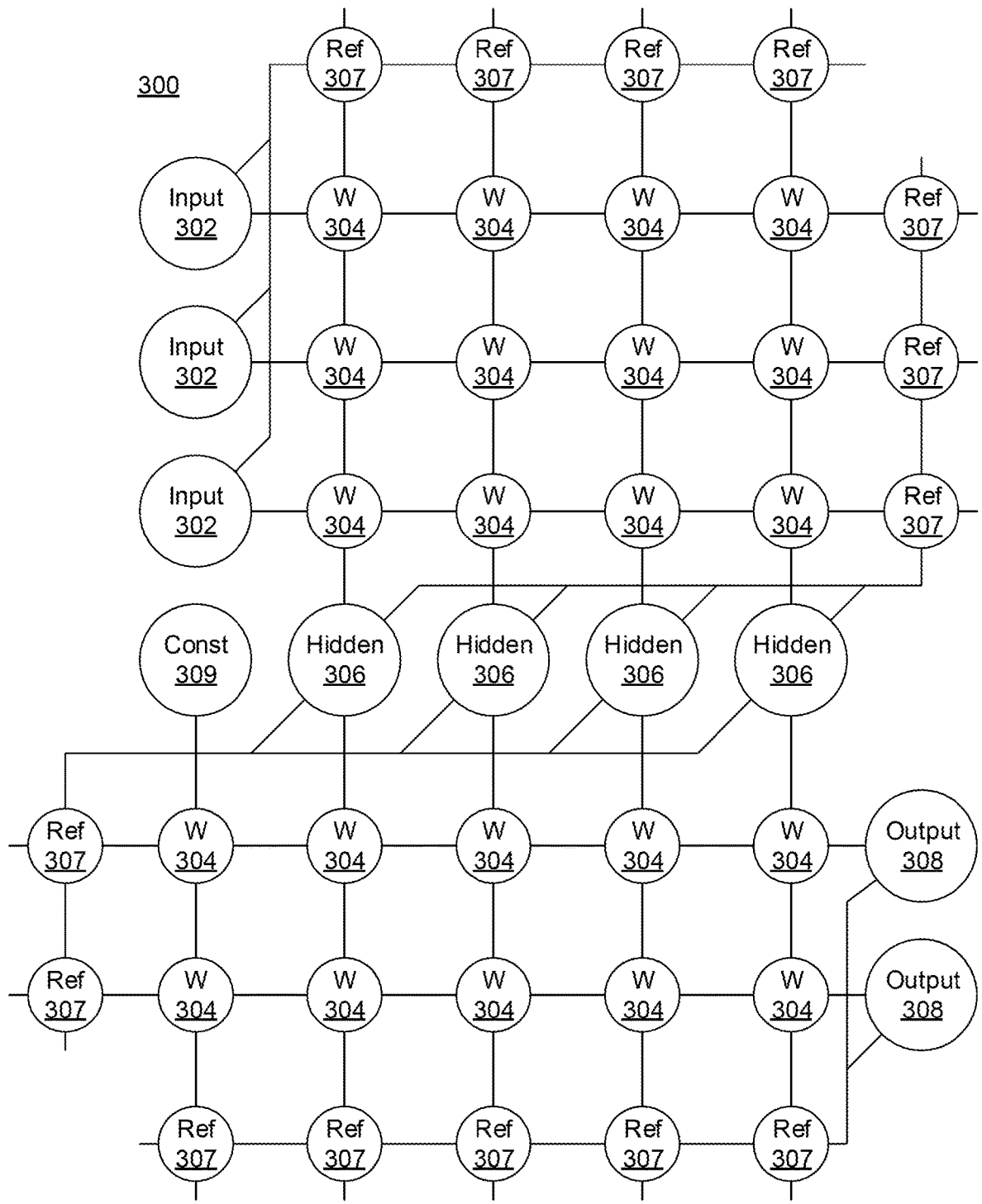
FIG. 3 is a block/flow diagram illustrating an exemplary artificial neural network (ANN) architecture, in accordance with an embodiment of the present invention.

Referring now to FIG. 2, with further reference to FIG. 3, a block/flow diagram showing a neuron 200 in a neural network is illustratively depicted in accordance with an embodiment of the present invention. In accordance with various embodiments of the present invention, this neuron can represent any of the input neurons 302, the hidden neurons 306, or the output neurons 308, as described in further detail herein below with reference to FIG. 3. It should be noted that FIG. 2 shows components to address all three phases of operation: feed forward, back propagation, and weight update. However, because the different phases do not overlap, there will necessarily be some form of control mechanism within in the neuron 200 to control which components are active. It should therefore be understood that there can be switches and other structures that are not shown in the neuron 200 to handle switching between modes.

In one embodiment of the present invention, in feed forward mode, a difference block 202 determines the value of the input from the array by comparing it to the reference input. This sets both a magnitude and a sign (e.g., + or −) of the input to the neuron 200 from the array. Block 204 performs a computation based on the input, the output of which is stored in storage 205. It is specifically contemplated that block 204 computes a non-linear function and can be implemented as analog or digital circuitry or can be performed in software. The value determined by the function block 204 is converted to a voltage at feed forward generator 206, which applies the voltage to the next array. The signal propagates this way by passing through multiple layers of arrays and neurons until it reaches the final output layer of neurons. The input is also applied to a derivative of the non-linear function in block 208, the output of which is stored in memory 209.

During back propagation mode, an error signal can be generated. The error signal can be generated at an output neuron 208 or can be computed by a separate unit that accepts inputs from the output neurons 208 and compares the output to a correct output based on the training data. Otherwise, if the neuron 200 is a hidden neuron 306, it receives back propagating information from the array of weights 304 and compares the received information with the reference signal at difference block 210 to provide a continuously valued, signed error signal. This error signal is multiplied by the derivative of the non-linear function from the previous feed forward step stored in memory 209 using a multiplier 212, with the result being stored in the storage 213. The value determined by the multiplier 212 is converted to a backwards propagating voltage pulse proportional to the computed error at back propagation generator 214, which applies the voltage to the previous array. The error signal propagates in this way by passing through multiple layers of arrays and neurons until it reaches the input layer of neurons 302 in FIG. 3.

In one embodiment of the present invention, during weight update mode, after both forward and backward passes are completed, each weight 304 is updated proportionally to the product of the signal passed through the weight during the forward and backward passes. The update signal generators 216 provide voltage pulses in both directions (though note that, for input and output neurons, only one direction will be available). The shapes and amplitudes of the pulses from update generators 216 are configured to change a state of the weights 304, such that the resistance of the weights 304 is updated.

In various embodiments of the present invention, the weights 304 can be implemented in software or in hardware, for example using relatively complicated weighting circuitry or using resistive cross point devices in accordance with the present invention. Such resistive devices can have switching characteristics that have a non-linearity that can be used for processing data. The weights 304 can belong to a class of device called a resistive processing unit (RPU), because their non-linear characteristics are used to perform calculations in the neural network 300. The RPU devices can be implemented with resistive random access memory (RRAM), phase change memory (PCM), programmable metallization cell (PMC) memory, or any other device that has non-linear resistive switching characteristics. Such RPU devices can also be considered as memristive systems.

Referring now to FIG. 3, a block/flow diagram showing an exemplary artificial neural network (ANN) architecture 300 is illustratively depicted in accordance with an embodiment of the present invention. It should be understood that the present architecture is purely exemplary, and that other architectures or types of neural network can be used instead in accordance with various embodiments of the present invention.

In one embodiment of the present invention, during feed-forward operation, a set of input neurons 302 each provide an input voltage in parallel to a respective row of weights 304. The weights 304 each have a settable resistance value, such that a current output flows from the weight 304 to a respective hidden neuron 306 to represent the weighted input. The current output, I, by a given weight is determined as $$I = -\frac{V}{r},$$

where V is the input voltage from the input neuron 302 and r is the set resistance of the weight 304. The current from each weight adds column-wise and flows to a hidden neuron 306. A set of reference weights 307 have a fixed resistance and combine their outputs into a reference current that is provided to each of the hidden neurons 306. Because conductance values can only be positive numbers, some reference conductance is needed to encode both positive and negative values in the matrix. The currents produced by the weights 304 are continuously valued and positive, and therefore the reference weights 307 are used to provide a reference current, above which currents are considered to have positive values and below which currents are considered to have negative values.

As an alternative to using the reference weights 307, another embodiment of the present invention can use separate arrays of weights 304 to capture negative values. Using the reference weights 307 is more efficient in chip area, but reference values need to be matched closely to one another. In contrast, the use of a separate array for negative values does not involve close matching as each value has a pair of weights to compare against. However, the negative weight matrix approach can use roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 304 of both positive and negative arrays are updated, but this also increases signal-to-noise ratio as each weight value is a difference of two conductance values. The two embodiments of the present invention provide identical functionality in encoding a negative value and those having ordinary skill in the art will be able to choose a suitable embodiment for the application at hand.

The hidden neurons 306 use the currents from the array of weights 304 and the reference weights 307 to perform some calculation. The hidden neurons 306 then output a voltage of their own to another array of weights 304. This array performs in the same way, with a column of weights 304 receiving a voltage from their respective hidden neuron 306 to produce a weighted current output that adds row-wise and is provided to the output neuron 308.

It should be understood that any number of these stages can be implemented, by interposing additional layers of arrays and hidden neurons 306. It should also be noted that some neurons can be constant neurons 309, which provide a constant voltage to the array. The constant neurons 309 can be present among the input neurons 302 and/or hidden neurons 306 and are only used during feed-forward operation.

During back propagation, the output neurons 308 provide a voltage back across the array of weights 304. The output layer compares the generated network response to training data and computes an error. The error is applied to the array as a voltage pulse, where the height and/or duration of the pulse is modulated proportional to the error value. In this example, a row of weights 304 receives a voltage from a respective output neuron 308 in parallel and converts that voltage into a current which adds column-wise to provide an input to hidden neurons 306. The hidden neurons 306 combine the weighted feedback signal with a derivative of its feed-forward calculation and stores an error value before outputting a feedback signal voltage to its respective column of weights 304. This back propagation travels through the entire network 300 until all hidden neurons 306 and the input neurons 302 have stored an error value.

During weight updates, the input neurons 302 and hidden neurons 306 apply a first weight update voltage forward and the output neurons 308 and hidden neurons 306 apply a second weight update voltage backward through the network 300. The combinations of these voltages create a state change within each weight 304, causing the weight 304 to take on a new resistance value. In this manner the weights 304 can be trained to adapt the neural network 300 to errors in its processing. It should be noted that the three modes of operation, feed forward, back propagation, and weight update, do not overlap with one another.

Figure 4:
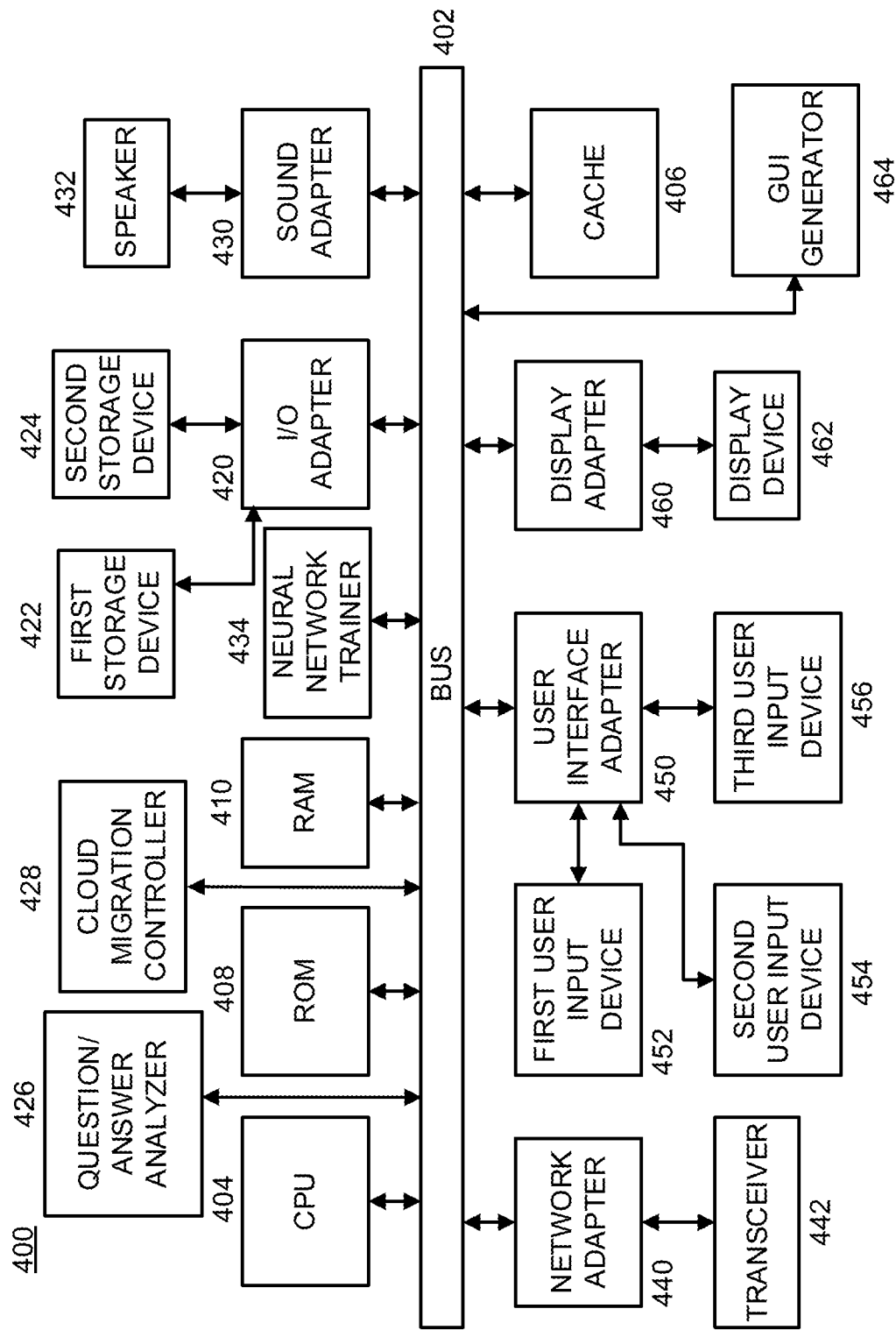
FIG. 4 is a high-level block diagram illustrating an exemplary processing system to which the present principles may be applied, in accordance with an embodiment of the present invention.

Referring now to FIG. 4, a high-level block diagram showing an exemplary processing system 400 to which the present principles can be applied is illustratively depicted in accordance with an embodiment of the present invention.

The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400. In accordance with aspects of the present invention, a question and/or answer analyzer 426 configured for analyzing, prioritizing, predicting, ranking, etc. questions and/or answers, a neural network model trainer 434, and a customized graphical user interface (GUI) generator 464 can be utilized for generating, selecting, presenting, training a neural network model (e.g., content generation model) and/or interacting with the system 400. In some embodiments of the present invention, a cloud migration controller device 428 can be utilized (e.g., automatically or manually) in conjunction with the GUI generated by the GUI generator 464 for efficient cloud migration of any of a plurality of applications and services.

Of course, the processing system 400 can also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Moreover, it is to be appreciated that systems 100, 200, 300, 500, 600, and 1100, described with respect to FIGS. 1, 2, 3, 5, 6, and 11, respectively, are systems for implementing respective embodiments of the present invention. Part or all of processing system 400 can be implemented in one or more of the elements of systems 100, 200, 300, 500, 600, and 1100, according to various aspects of the present invention.

Further, it is to be appreciated that processing system 400 can perform at least part of the methods described herein including, for example, at least part of methods 700, 800, 820, 900, 910, and 1000 of FIGS. 7, 8A, 8B, 9A, 9B, and 10, respectively. Similarly, part or all of system 1100 can be used to perform at least part of methods 700, 800, 820, 900, 910, and 1000 of FIGS. 7, 8A, 8B, 9A, 9B, and 10, respectively, according to various aspects of the present invention.

Figure 5:
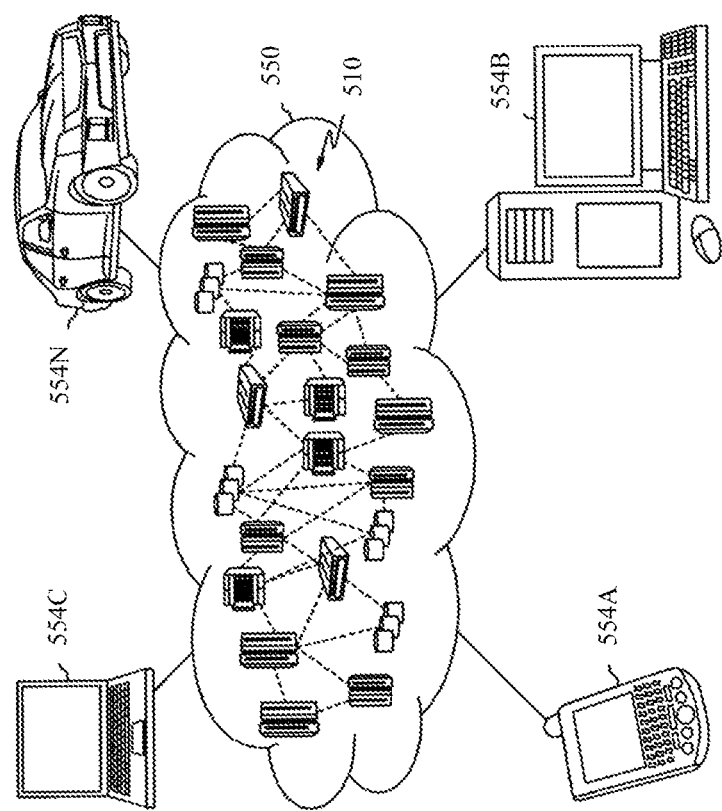
FIG. 5 is a block diagram showing an illustrative cloud computing environment having one or more cloud computing nodes with which local computing devices used by cloud consumers communicate, in accordance with an embodiment of the present invention.

Referring now to FIG. 5, an illustrative cloud computing environment 550 is depicted in accordance with an aspect of the present invention. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N can communicate. Nodes 510 can communicate with one another. They can be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
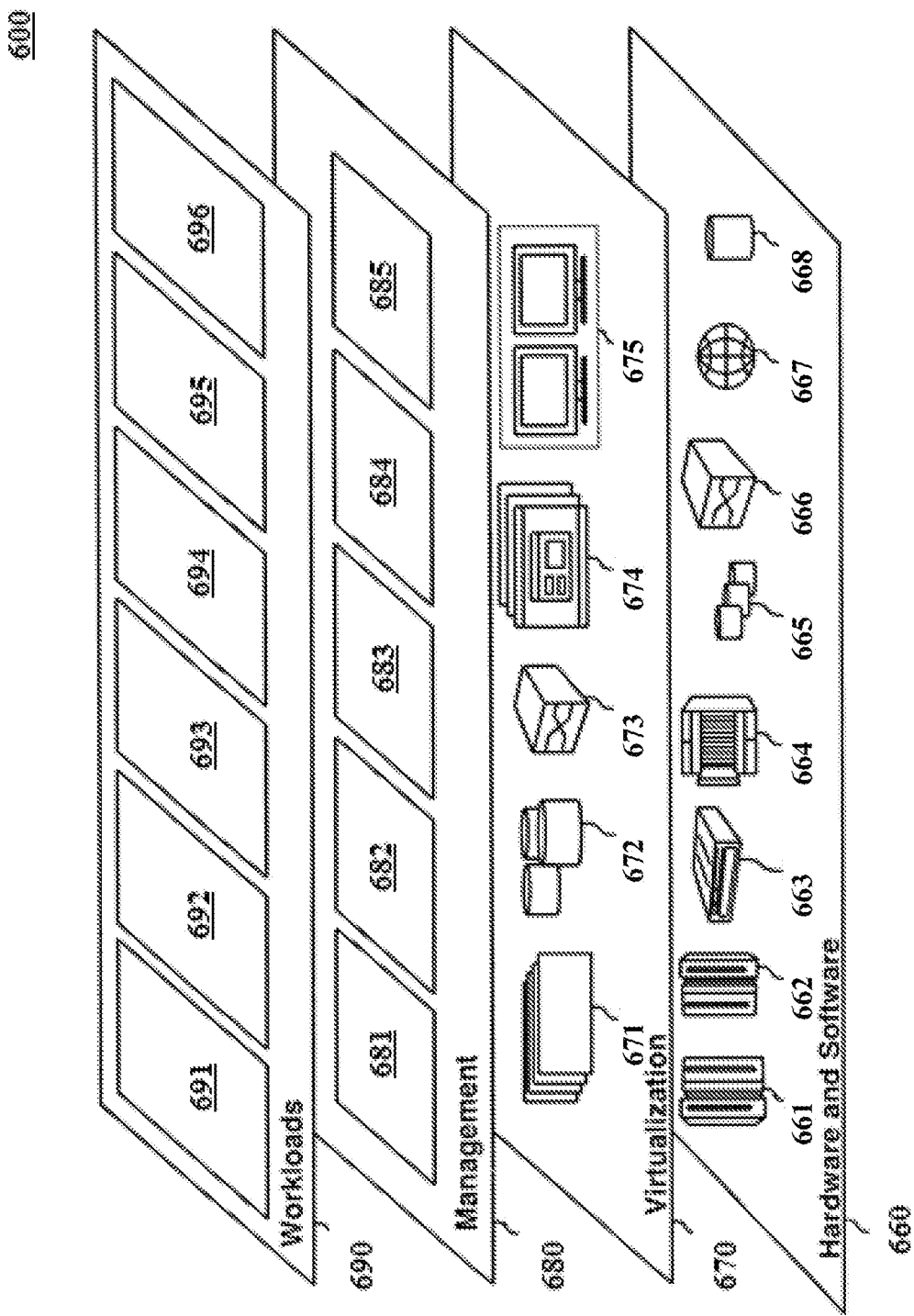
FIG. 6 is a block diagram showing a set of functional abstraction layers provided by a cloud computing environment, in accordance with an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments of the present invention, software components include network application server software 667 and database software 668.

Virtualization layer 670 provides an abstraction layer from which the following examples of virtual entities can be provided: virtual servers 671; virtual storage 672; virtual networks 673, including virtual private networks; virtual applications and operating systems 674; and virtual clients 675.

In one example, management layer 680 can provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment can be utilized. Examples of workloads and functions which can be provided from this layer include: mapping and navigation 691; software development and lifecycle management 692; virtual classroom education delivery 693; data analytics processing 694; and transaction processing 695 in accordance with various aspects of the present invention.

Figure 7:
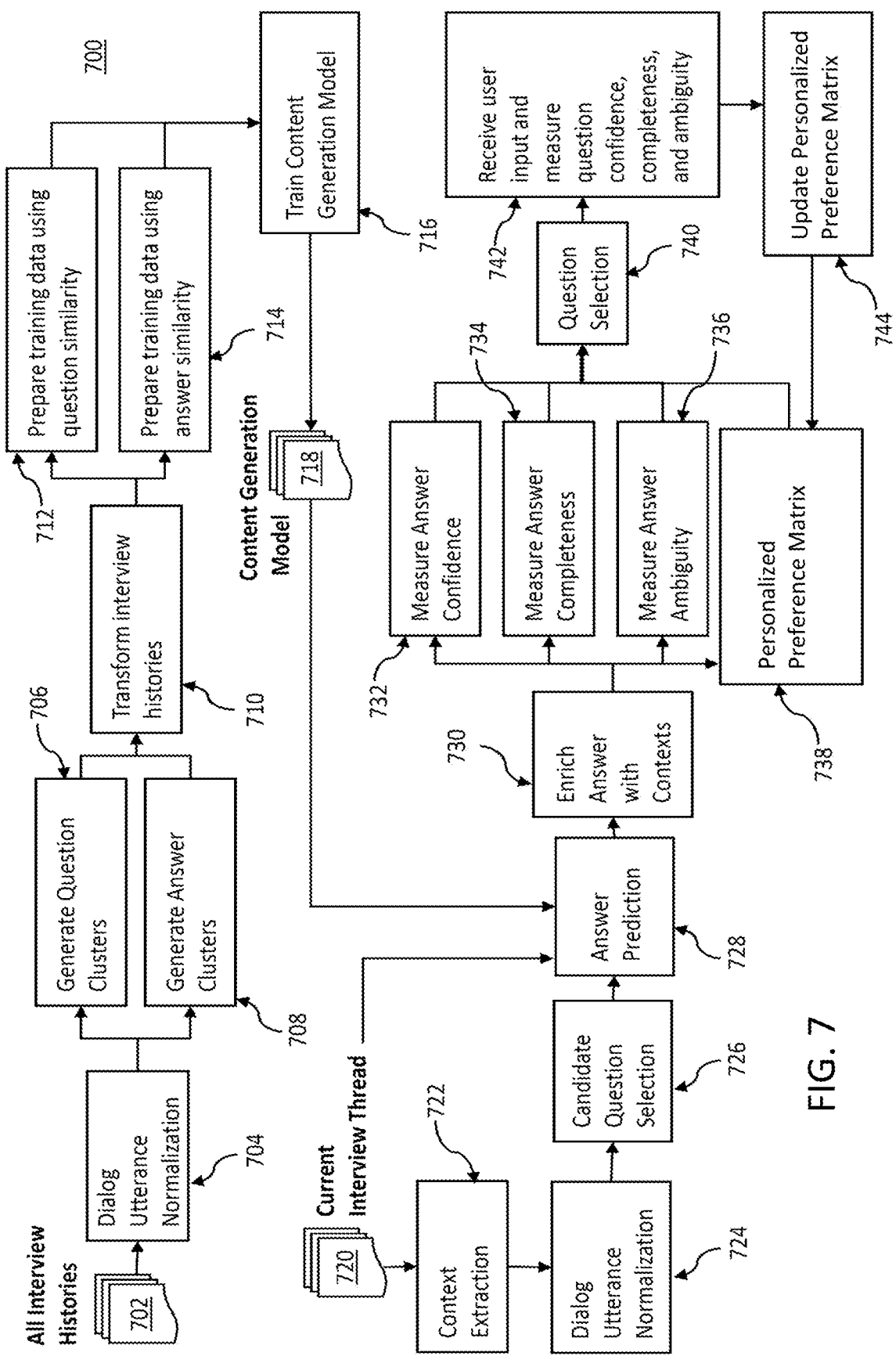
FIG. 7 is a block/flow diagram illustrating a method for managing cloud migration of applications and services based on prioritized interview questions and predicted user preferences, in accordance with an embodiment of the present invention.

Referring now to FIG. 7, a block/flow diagram showing a method 700 for managing cloud migration (e.g., migration of applications, services, data, etc.) based on prioritized interview questions and predicted user preferences is illustratively depicted in accordance with an aspect of the present invention.

In various embodiments of the present invention, interview histories can be received as input in block 702, and dialog utterance normalization can be performed in bock 704 in accordance with an aspect of the present invention. In block 706, question clusters can be generated, and corresponding answer clusters can be generated in bock 708. In some embodiments of the present invention, each question can be one dialog utterance (e.g., one sentence), and one or more clustering methods (e.g., K-Means) can be utilized to generate the question clusters in block 706. Interview histories can be transformed in block 710, and can include, for example, selecting one question (e.g., the first in this cluster) for each question cluster as a representative question. Then, for each question q in the interview histories, if q is in question cluster QC, q can be replaced with the representative question in QC in accordance with an embodiment of the present invention. Training data can be prepared using question similarity in block 712, and in block 714, training data can be prepared using answer similarity, and can include, for example, extensions of dialog utterances based on an ontology graph, in accordance with aspects of the present invention, described in further detail herein below with reference to FIGS. 9A and 9B.

In accordance with aspects of the present invention, a content generation model can be trained in block 716 according to an aspect of the present invention. The content generation model can be sent as input in block 718, and a current interview thread 720 can be sent as input for answer prediction generation in block 728 in accordance with an aspect of the present invention. In some embodiments of the present invention, a current interview thread 720 can be sent as input for content extraction in block 722, and the context extraction in block 722 can include extracting the entities/intents from a current interview thread. For example, if an interview topic is regarding "NewYork", then the entity "City" with value "NewYork" can be extracted in accordance with aspects of the present invention. A benefit of this content extraction in block 722 is enriching/improving answers in block 730.

In accordance with aspects of the present invention, dialog utterance normalization can be performed in block 724, candidate question selection can be performed in block 726, and answer prediction/selection can be performed in block 728 according to aspects of the present invention. In block 726, the candidate question selection can include selecting the top-N frequent questions, where N can represent a predetermined number of questions, and answer selection can be based on neural network output, e.g., f(x)=y, where f represents a content generation model, x represents a current question and current interview thread, and y represents a predicated answer, in accordance with aspects of the present invention.

In various embodiments of the present invention, the answers predicted in block 728 can be enriched with context 730 (e.g., using a co-reference solution based on calculations of answer confidence/completeness/ambiguity) in accordance with aspects of the present invention. In block 732, answer confidence can be measured, answer completeness can be measured in block 734, answer ambiguity can be measured in block 736, and a PPM can be generated, amended, updated, received, input, etc. in block 738 in accordance with aspects of the present invention. In block 740, question selection can be performed by, for example, selecting a largest weighted value based on answer confidence, completeness, ambiguity, as further refined by the preference matrix, and in block 742 user input and measures of question confidence, completeness, and ambiguity can be determined according to aspects of the present invention. In some embodiments of the present invention, the PPM 738 can be iteratively updated in block 744 until a threshold condition is met according to aspects of the present invention.

In accordance with aspects of the present invention, the PPM 730 can be represented as follows:

preference value, completeness preference value, and ambiguity preference value of all persons for all typical categories C in accordance with various aspects of the present invention.

Figure 8A:
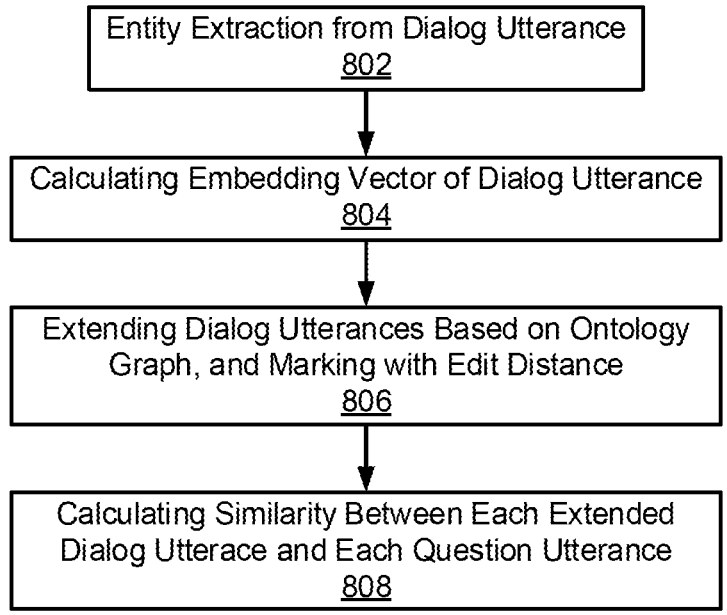
FIG. 8A is a block/flow diagram illustrating a method for dialog utterance normalization for determining latent client knowledge for questions, in accordance with an embodiment of the present invention.
Figure 8A:
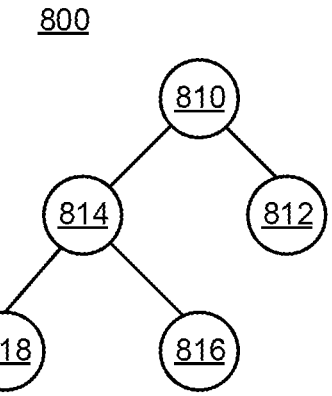

Referring now to FIG. 8A, a block/flow diagram showing a method 800 for dialog utterance normalization for determining latent client knowledge for questions is illustratively depicted in accordance with an embodiment of the present invention.

In some embodiments of the present invention, latent client knowledge can be determined by performing entity extraction from dialog utterances for questions can be performed in block 802, and an embedding vector of the dialog utterance (e.g., standard, non-standard) can be determined in block 804. In block 806, dialog utterances can be extended based on an ontology graph, and marked with edit distance in accordance with an aspect of the present invention. In some embodiments of the present invention, similarity can be calculated between each extended dialog utterance and each question utterance in block 808, as described further hereinbelow with reference to FIGS. 9A and 9B. An abstraction (e.g., ontology graph) can be generated, and can include one or more of a task 810, an option 812, an order 814, a non-standard order 816, and a standard order 818 in accordance with various aspects of the present invention.

Figure 8B:
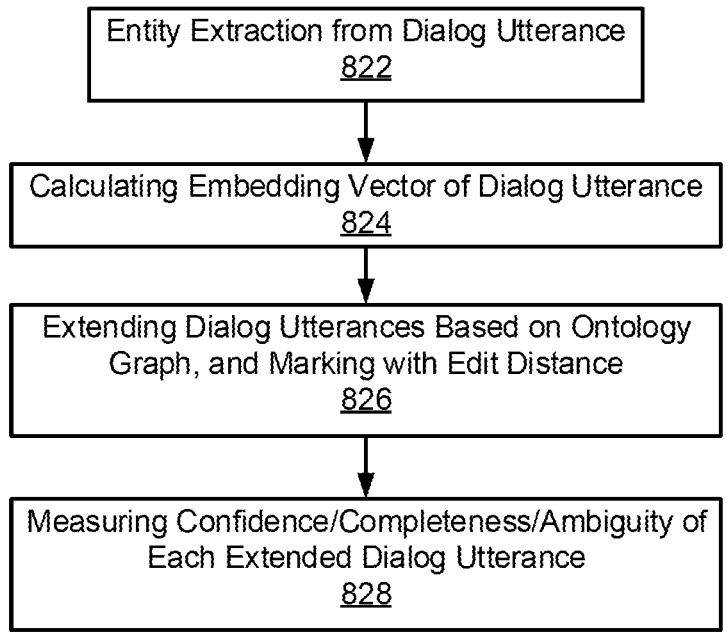
FIG. 8B is a block/flow diagram illustrating a method for dialog utterance normalization for determining latent client knowledge for answers, in accordance with an embodiment of the present invention.
Figure 8B:
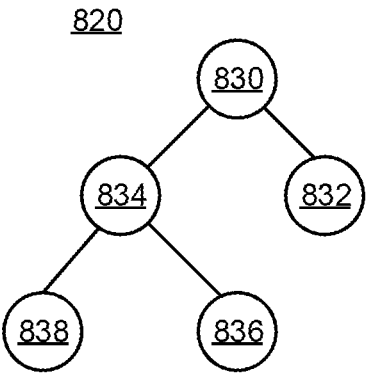

Referring now to FIG. 8B, a block/flow diagram showing a method 820 for dialog utterance normalization for determining latent client knowledge for answers is illustratively depicted in accordance with an embodiment of the present invention.

In some embodiments of the present invention, latent client knowledge can be determined by performing entity extraction from dialog utterances for answers can be performed in block 822, and an embedding vector of the dialog utterance (e.g., standard, non-standard) can be determined in block 824. In block 826, dialog utterances can be extended based on an ontology graph, and marked with edit distance in accordance with an aspect of the present invention. In some embodiments of the present invention, confidence, completeness, and ambiguity of each extended dialog utterance can be measured/determined in block 828. An abstraction (e.g., ontology graph) can be generated, and can include one or more of a task 830, an option 832, an order 834, a non-standard order 836, and a standard order 838 in accordance with various aspects of the present invention.

TABLE 1

Personalized Preference Matrix

| | $C_{1,a}$ | $C_{1,b}$ | $C_{1,c}$ | $C_{2,a}$ | $C_{2,b}$ | $C_{2,c}$ | $C_{3,a}$ | $C_{3,b}$ | $C_{3,c}$ | ... | $C_{N,a}$ | $C_{N,b}$ | $C_{N,c}$ |
|---|---|---|---|---|---|---|---|---|---|---|---|---|---|
| $P_1$ | 0.5 | 0.6 | 0.5 | 0.8 | 0.8 | 0.2 | 0.9 | 0.9 | 0.1 | ... | 0.7 | 0.8 | 0.3 |
| $P_2$ | 0.7 | 0.7 | 0.4 | 0.9 | 0.8 | 0.2 | 0.8 | 0.7 | 0.3 | ... | 0.5 | 0.5 | 0.4 |
| $P_3$ | 0.8 | 0.9 | 0.3 | 0.7 | 0.5 | 0.5 | 0.8 | 0.8 | 0.4 | ... | 0.8 | 0.7 | 0.3 |
| ... | ... | ... | ... | ... | ... | ... | ... | ... | ... | | ... | ... | ... |
| $P_M$ | $w_{m1,a}$ | $w_{m1,b}$ | $w_{m1,c}$ | $w_{m2,a}$ | $w_{m2,b}$ | $w_{m2,c}$ | $w_{m3,a}$ | $w_{m3,b}$ | $w_{m3,c}$ | | $w_{mn,a}$ | $w_{mn,b}$ | $w_{mn,c}$ | where the set of interview questions Q includes most common categories of Q, represented by C, and the size of C can be represented by N, and M represents a number of interviewed users. For each category $C_i$ in C, the confidence preference value, completeness preference value, and ambiguity preference value of one user can be represented by $C_{i,a}$, $C_{i,b}$, and $C_{i,c}$, respectively. The exemplary PPM of Table 1 can be utilized as a matrix to record the confidence In accordance with various aspects of the present invention, in block 828, answer confidence, completeness, and ambiguity can be determined by prebuilding confidence vocabulary, prebuilding completeness vocabulary, and prebuilding ambiguity vocabulary, which can include assigning values for degrees of confidence, completeness, and ambiguity. In some embodiments of the present invention, prebuilding confidence vocabulary in block 828 can include, for example, Confidence Value=10 for an answer of "100% sure", Confidence Value=6 for an answer of "maybe", and Confidence Value=0 for answer of "do not know", and similarly for the prebuilding of completeness vocabulary, and ambiguity vocabulary. In some aspects of the present invention, these values can be utilized as input to the PPM (described above with reference to FIG. 7) to generate/consider features of individual clients, and prevent overfitting during neural model training. In some embodiments of the present invention, based on the answer prediction using the content generation model, an ordered list for possible (e.g., predicted) answers can be generated by measuring the answer confidence, completeness, and ambiguity for each answer in block 828, multiplying by the PPM, and ranking candidate questions based on this reference data. The top ranked questions can be selected and asked to one or more users, feedback can be received, and the PPM can be adjusted in accordance with aspects of the present invention.

Figure 9A:
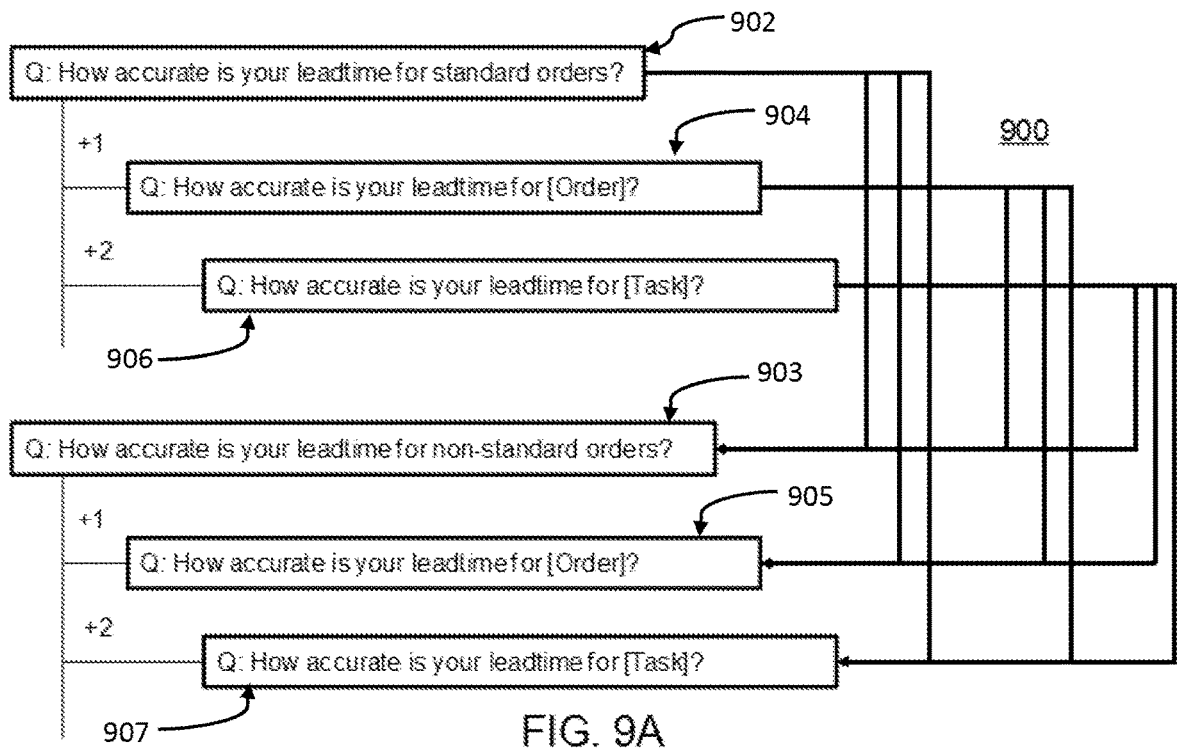
FIG. 9A is an exemplary high-level ontology graph for calculating similarity by extending dialog utterances, in accordance with an embodiment of the present invention.

Referring now to FIG. 9A, an exemplary high-level ontology graph for calculating similarity by extending dialog utterances is illustratively depicted in accordance with an embodiment of the present invention. In accordance with aspects of the present invention, similarity can be calculated based on the ontology graph 900 by, for example, extending the question "Q: How accurate is your leadtime for standard orders?" in block 902 to the question "Q: How accurate is your leadtime for [Order]?" in block 904 by replacing "standard orders" with "[order]". Then, similarly, in block 903, the question "Q: How accurate is your leadtime for non-standard orders?" can be extended in block 905 to be "Q: How accurate is your leadtime for [Order]?" to "Q: How accurate is your leadtime for [Task]?" by replacing "[Order]" with "[Task]" in block 907 in accordance with various aspects of the present invention.

In an exemplary embodiment of the present invention, if one question Q1 is assumed to be "Q: How accurate is your leadtime for standard orders?", another question Q2 can be "Q: How accurate is your leadtime for [Order]?". Then, since Q1 can be edited into Q2 with just one step change, the edit distance is 1, and the similarity is (1−1/N), where N is the maximum edit distance for all dialog utterances in the training data. Thus, the final similarity can be represented as: (edit_distance_similarity)*(dialog utterance_similarity), where dialog utterance_similarity equals 1 in this exemplary embodiment of the present invention.

In accordance with aspects of the present invention, historical log data (e.g., answers of previous users to one or more questions) can be utilized to find implicit question relations based on strong similarities (e.g., above/below a predetermined threshold level). For example, in an exemplary embodiment in which questions were previously asked to different users, (e.g., Q1: "How accurate is your leadtime for standard orders"; Q2: "What is your inventory turnover lead times"), in which the final answers are similar (e.g., A1: "[Amount] but I am not quite sure"; A2: "[Amount], not very sure"), a high level of similarity, and thus implicit relations can be identified and stored for prioritizing questions and/or predicting questions/answers in accordance with various aspects of the present invention.

Figure 9B:
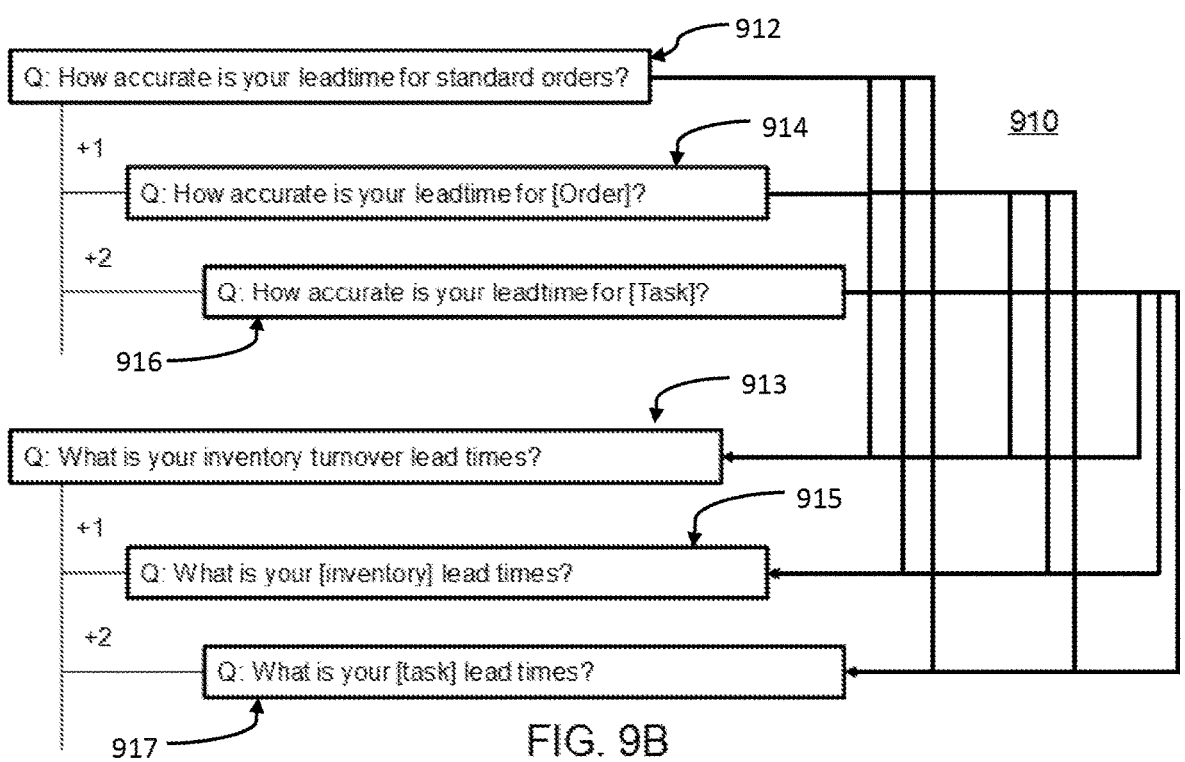
FIG. 9B is an exemplary high-level ontology graph for calculating similarity by extending dialog utterances, in accordance with an embodiment of the present invention.

Referring now to FIG. 9B, an exemplary high-level ontology graph for calculating similarity by extending dialog utterances is illustratively depicted in accordance with an embodiment of the present invention. In accordance with aspects of the present invention, similarity can be calculated based on the ontology graph 910 by, for example, extending the question "Q: How accurate is your leadtime for standard orders?" in block 912 to the question "Q: How accurate is your leadtime for [Order]?" in block 914 by replacing "standard orders" with "[Order]". Then, similarly, in block 913, the question "Q: What is your inventory turnover lead times?" can be extended in block 915 to be "Q: What is your [Inventory] lead times?" to "Q: What is your [task] lead times?" by replacing "[Inventory]" with "[Task]" in block 917 in accordance with various aspects of the present invention. Thus, the final similarity can be represented as: (edit_distance_similarity)*(dialog utterance_similarity), and the above illustrative example shows that if after editing, the dialog utterance is still different, then similarity can be calculated between two dialog utterances using sentence similarity (e.g., based on sentence embedding vectors) according to various aspects of the present invention.

In accordance with aspects of the present invention, historical log data (e.g., answers of previous users to one or more questions) can be utilized to find implicit question relations based on strong similarities (e.g., above/below a predetermined threshold level). For example, in an exemplary embodiment in which questions were previously asked to different users, (e.g., Q1: "How accurate is your leadtime for standard orders"; Q2: "What is your inventory turnover lead times"), in which the final answers are similar (e.g., A1: "[Amount] but I am not quite sure"; A2: "[Amount], not very sure"), a high level of similarity, and thus implicit relations can be identified and stored for prioritizing questions and/or predicting questions/answers in accordance with various aspects of the present invention.

Figure 10:
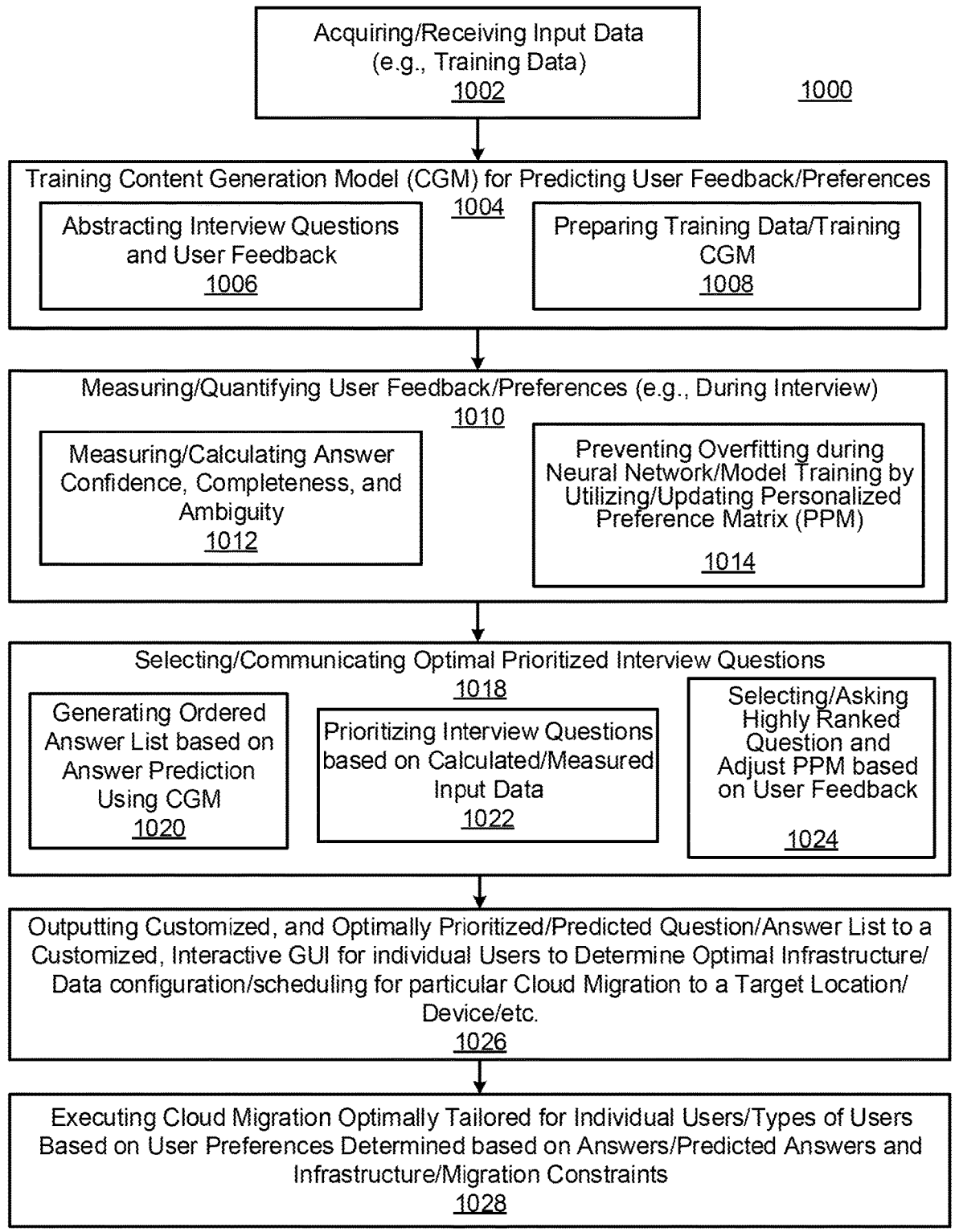
FIG. 10 is a block/flow diagram illustrating a method for managing cloud migration of applications and services based on prioritized interview questions and predicted user preferences, in accordance with an embodiment of the present invention.

Referring now to FIG. 10, a block/flow diagram illustrating a method 1000 for managing cloud migration of applications and services based on prioritized interview questions and predicted user preferences is illustratively depicted in accordance with an embodiment of the present invention.

In accordance with various aspects of the present invention, input data (e.g., training data) can be acquired/received in block 1002, and a content generation model (CGM) can be trained for predicting user feedback and/or preferences in block 1004. Interview questions and user feedback can be abstracted in block 1006, and training data can be prepared and the CGM can be trained in block 1008. In block 1010, user feedback and user preferences can be measured/quantified (e.g., during interview of a user), by, for example, measuring/determining answer confidence, completeness, and/or ambiguity in block 1012, and overfitting during neural network/model training can be prevented in block 1014 by utilizing and/or updating a PPM in accordance with various aspects of the present invention.

In block 1018, optimal prioritized interview questions can be generated, selected, and/or communicated in accordance with aspects of the present invention. In block 1020, an ordered answer list can be generated based on answer predictions using the CGM, interview questions can be prioritized based on calculated/measured input data (e.g., answer confidence, completeness, ambiguity, PPM, etc.). In block 1022, and highly ranked (e.g., with respect to predefined ranking levels) can be selected and/or presented to one or more users, and the PPM can be adjusted based on user feedback in block 1024 in accordance with various aspects of the present invention.

In block 1026, a customized, and optimally prioritized and/or predicted question and/or answer list can be output to a customized, interactive graphical user interface (GUI) for individual users and/or types of users to determine optimal infrastructure/data configuration/scheduling for a particular cloud migration to a particular target location/device/etc. in accordance with aspects of the present invention. In block 1028, cloud migration optimally tailored for individual users/types of users based on user preferences determined based on answers and/or predicted answers and infrastructure/migration constraints can be executed in accordance with various aspects of the present invention.

Figure 11:
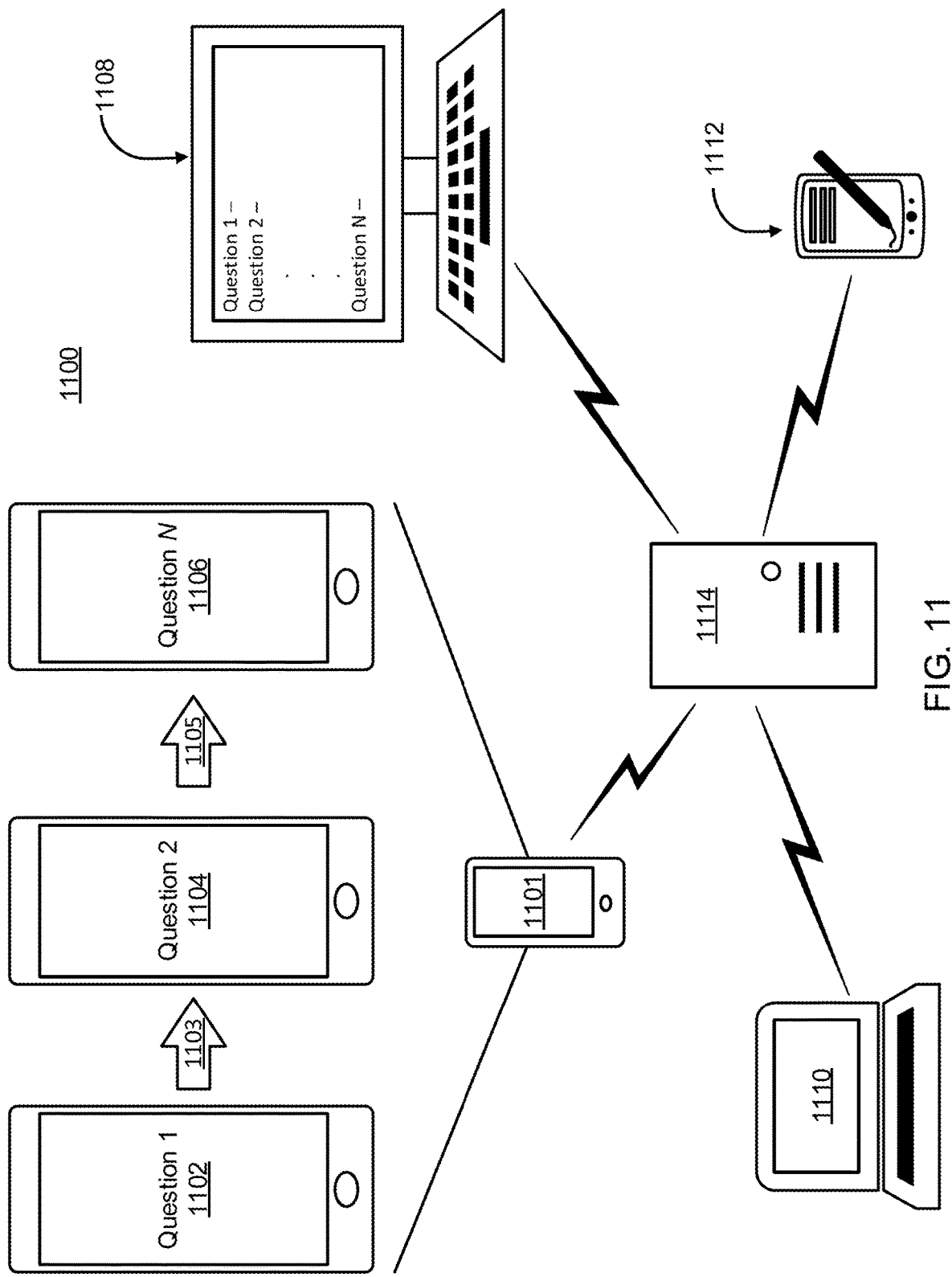
FIG. 11 is a diagram showing a system for selecting and displaying customized, prioritized interview questions and predicted user preferences, in accordance with an embodiment of the present invention.

Referring now to FIG. 11, a diagram showing a system 1100 for generating, selecting, and/or displaying customized, prioritized interview questions and predicted user preferences is illustratively depicted in accordance with aspects of the present invention. In an exemplary embodiment of the present invention, the system can generate, select, and display customized, prioritized interview questions and/or predicted user preferences for efficient management of cloud migration of applications and services. However, it is to be appreciated that the customized, prioritized interview questions can be generated, selected, and/or displayed for any of a plurality of types of subject matter/fields in accordance with various aspects of the present invention. In accordance with various aspects of the present invention, a server 1114 (e.g., remote or local) or other type of computing device can determine an optimal, customized and prioritized order for asking questions (e.g., regarding cloud migration, site efficiency, etc.) to one or more users, and can generate and/or populate an optimal GUI for displaying and/or interacting with the system to improve efficiency of interviewing users and/or improving cloud migration speed and efficiency. There are a plurality of different display (e.g., GUI) formats that can be employed in accordance with various aspects of the present invention.

For example, a portable communication device 1101 (e.g., cellular telephone, smartphone device, etc.) is known to have a relatively small screen, which can cause reading a list of questions to be cumbersome and difficult to read. In an aspect of the present invention, a GUI can be generated and/or populated with prioritized questions in a manner which increases usability and/or readability of the questions. In an exemplary embodiment of the present invention, screen views 1102, 1104, and 1106 represent different prioritized questions, which can be interacted with (e.g., answer question, skip question by swiping for non-relevant questions, etc.) using the customized GUI of the portable communication device 1101 (e.g., cellular telephone, smartphone, etc.). It is to be appreciated that multiple questions can also be presented on a display screen of a single portable communication device 1101 (e.g., cellular telephone, smartphone, etc.) in accordance with various aspects of the present invention. Similarly to the customized GUI for generating and/or displaying prioritized interview questions using the portable communication device 1101 (e.g., cellular telephone, smartphone, etc.), a personal computer (PC) and/or virtual machine (VM) 1108, a laptop computer 1110, and/or any type of portable computing device 1112 (e.g., personal digital assistant (PDA), tablet, phablet, etc.) can include a similar interface/layout for interacting with the system 1100. In some aspects of the present invention, rather than presenting the prioritized questions as shown in 1102, 1104, and 1106, the interface can display the questions as an ordered list (e.g., on a single or multiple screens), in separate smaller windows on a computer screen, and/or highlight highly prioritized questions (e.g., above a threshold level) to improve speed and efficiency of presenting and/or answering interview questions for one or more users.

In accordance with aspects of the present invention, the GUIs shown in, for example, 1102, 1104, 1106, and 1108 can be customized to quickly and efficiently display and/or answer prioritized questions from a question database and/or repository, and the questions can be presented to users in rank order (e.g., the highest ranked and/or highest priority question displayed first, followed by the next highest ranked question and/or highest priority question, etc.) to users. In some embodiments of the present invention, questions that are determined to have very low priority can be removed from the list, or presented at the end of the list/swipe through display. Presenting the highest priority questions before lower priority questions ensures that high priority questions will be responded to even in an instance in which users may not fully complete all questions (e.g., due to time constraints, etc.). The questions can be customized in a plurality of ways, including, for example filtered into groups by job type, user skills, areas of expertise, etc.), and users in particular groups can be presented similar questions based on the group and/or historical answers to questions in accordance with various aspects of the present invention. In accordance with aspects of the present invention, user answers can be predicted based on the filtered groups, using for example, Seq2Seq machine learning, for remaining questions to reduce a number of questions required to be answered for a particular task (e.g., cloud migration), thus reducing the time for completing the interview questions for other similar users.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the present invention, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for managing cloud migration of applications and services based on prioritized interview questions and predicted user preferences (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for prioritizing interview questions, comprising:
predicting answers to questions in a candidate question set using a neural network model;
generating a ranking for each of the questions in the candidate question set by determining answer confidence, completeness, and ambiguity for each of the answers, and incorporating user preferences using a personalized preference matrix (PPM); and automatically selecting and presenting a top ranked question to a user, and iteratively adjusting the personalized preference matrix for subsequent ranking of questions based on an answer to the top ranked question by the user to reduce computational resources expended.

2. The method as recited in claim 1, further comprising training the neural network model for predicting user answers for interview question and answer pairs based on latent user knowledge, wherein training data is prepared by abstracting historical interview questions and historical user feedback.

3. The method as recited in claim 1, wherein the neural network model is a content generation model.

4. The method as recited in claim 2, wherein the latent user knowledge is determined using dialog utterance normalization.

5. The method as recited in claim 1, further comprising calculating similarity by extending dialog utterances.

6. The method as recited in claim 1, wherein the determining answer confidence, completeness, and ambiguity for each of the answers includes prebuilding a confidence vocabulary, a completeness vocabulary, and an ambiguity vocabulary.

7. The method as recited in claim 1, wherein an ordered list of ranked questions is displayed to the user using a personalized interactive GUI configured to improve speed and efficiency of interviewing the user.

8. A system for prioritizing interview questions, comprising:
a processor device operatively coupled to a memory, the processor device being configured to:
predict, using an answer predictor, answers to questions in a candidate question set using a neural network model;
generate, using a ranker, a ranking for each of the questions in the candidate question set by determining answer confidence, completeness, and ambiguity for each of the answers, and incorporating user preferences using a personalized preference matrix (PPM);
automatically select and present a top ranked question to a user, and iteratively adjusting the PPM for subsequent ranking of questions based on an answer to the top ranked question by the user to reduce computational resources expended.

9. The system as recited in claim 8, wherein the processor device is further configured to train, using a neural network model trainer, the neural network model for predicting user answers for interview question/answer pairs based on latent user knowledge, wherein training data is prepared by abstracting historical interview questions and historical user feedback.

10. The system as recited in claim 8, wherein the neural network model is a content generation model.

11. The system as recited in claim 9, wherein the latent user knowledge is determined using dialog utterance normalization.

12. The system as recited in claim 8, further comprising calculating similarity by extending dialog utterances.

13. The system as recited in claim 8, wherein the determining answer confidence, completeness, and ambiguity for each of the answers includes prebuilding a confidence vocabulary, a completeness vocabulary, and an ambiguity vocabulary.

14. The system as recited in claim 8, wherein an ordered list of ranked questions is displayed to the user using a personalized interactive GUI configured to improve speed and efficiency of interviewing the user.

15. A non-transitory computer readable storage medium comprising a computer readable program for prioritizing interview questions, wherein the computer readable program when executed on a computer causes the computer to perform the steps of:
predicting answers to questions in a candidate question set using a neural network model;
generating a ranking for each of the questions in the candidate question set by determining answer confidence, completeness, and ambiguity for each of the answers, and incorporating user preferences using a personalized preference matrix (PPM); and
automatically selecting and presenting a top ranked question to a user, and iteratively adjusting the PPM for subsequent ranking of questions based on an answer to the top ranked question by the user to reduce computational resources expended.

16. The non-transitory computer readable storage medium as recited in claim 15, further comprising training the neural network model for predicting user answers for interview question and answer pairs based on latent user knowledge, the training data being prepared by abstracting historical interview questions and historical user feedback.

17. The non-transitory computer readable storage medium as recited in claim 15, wherein the neural network model is a content generation model.

18. The non-transitory computer readable storage medium as recited in claim 16, wherein the latent user knowledge is determined using dialog utterance normalization.

19. The non-transitory computer readable storage medium as recited in claim 15, further comprising calculating similarity by extending dialog utterances.

20. The non-transitory computer readable storage medium as recited in claim 15, wherein an ordered list of ranked questions is displayed to the user using a personalized interactive GUI configured to improve speed and efficiency of interviewing the user.

* * * * *